H. W. SCHATZ.
RADIAL DRILL.
APPLICATION FILED OCT. 4, 1909.

1,028,395.

Patented June 4, 1912.

4 SHEETS—SHEET 1.

Witnesses

Inventor
Herman W. Schatz
By Wood & Wood
Attorneys

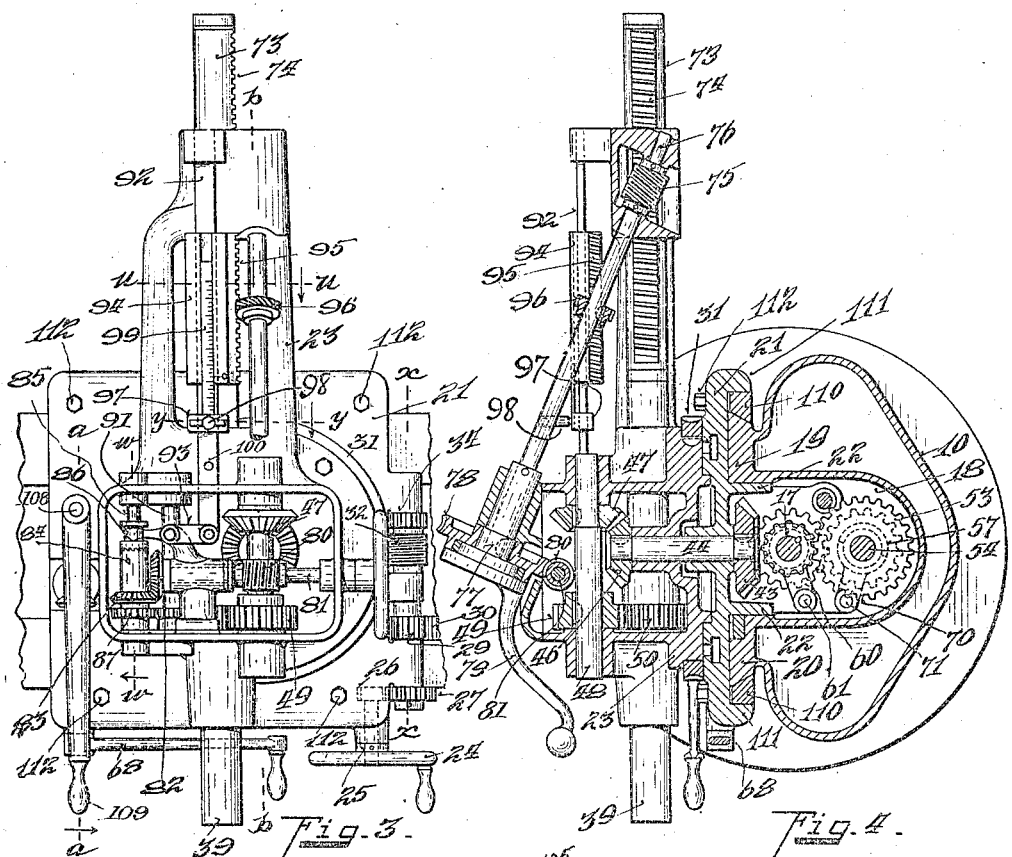

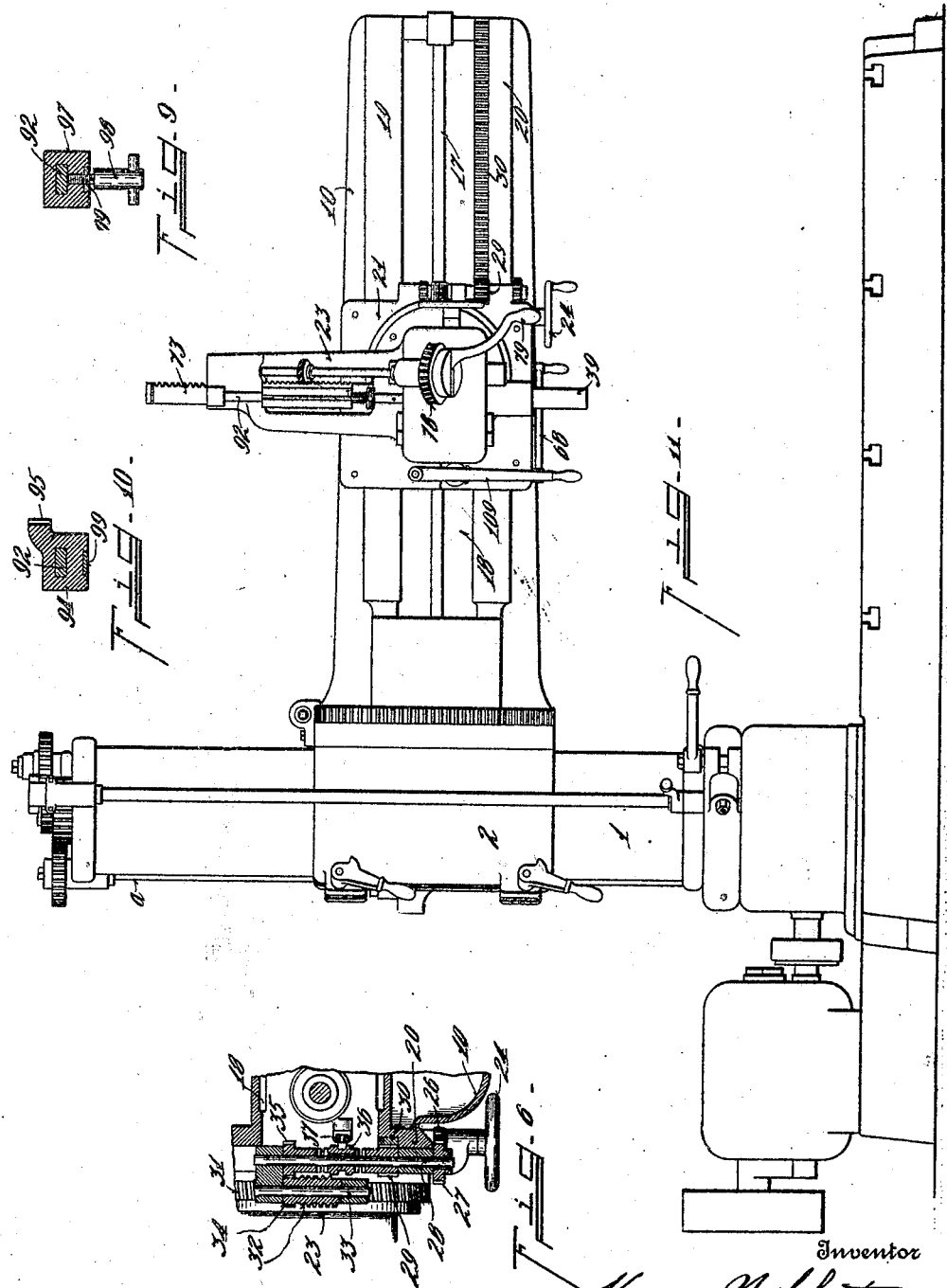

H. W. SCHATZ.
RADIAL DRILL.
APPLICATION FILED OCT. 4, 1909.
1,028,395.
Patented June 4, 1912.
4 SHEETS—SHEET 4.
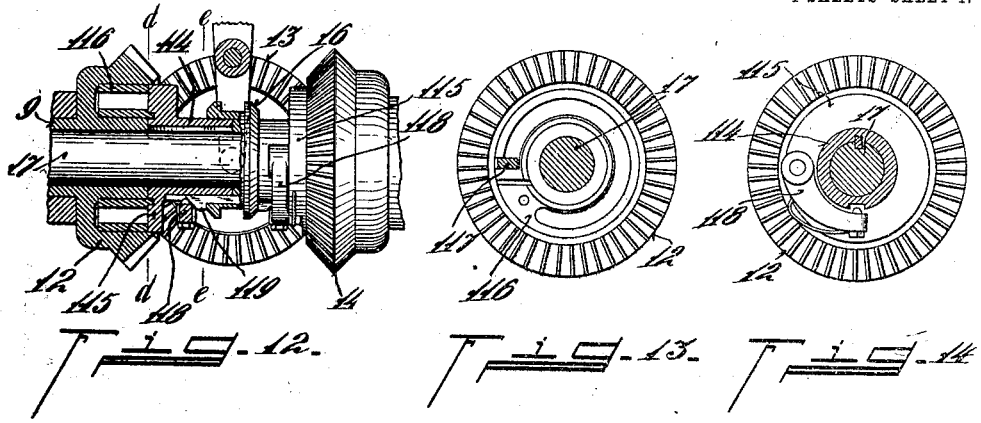
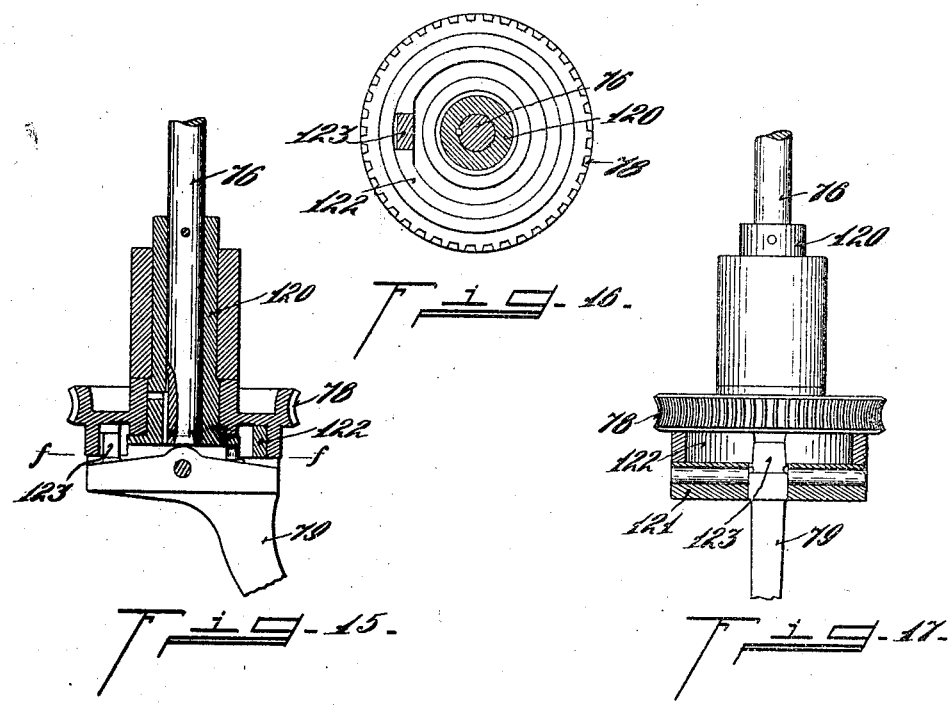
Witnesses
Inventor
Herman W. Schatz
By Ward & Wood
Attorneys

UNITED STATES PATENT OFFICE.

HERMAN W. SCHATZ, OF CINCINNATI, OHIO, ASSIGNOR TO THE AMERICAN TOOL WORKS COMPANY, OF CINCINNATI, OHIO, A CORPORATION OF OHIO.

RADIAL DRILL.

1,028,395.  Specification of Letters Patent.  Patented June 4, 1912.

Application filed October 4, 1909. Serial No. 520,848.

*To all whom it may concern:*

Be it known that I, HERMAN W. SCHATZ, a citizen of the United States, residing at Cincinnati, in the county of Hamilton and State of Ohio, have invented certain new and useful Improvements in Radial Drills, of which the following is a specification.

My invention relates to an improvement in the horizontal arm and its contained mechanism of a radial drill.

One of the objects of my invention is to provide an arm of a radial drill of hollow formation, with the intermediate portion U-shaped upon one side, providing a passage within which the transmitting elements of the head-stock travel.

Another object of my invention is to provide means for automatically stopping the cutting feed of the drill spindle at a predetermined limit of spindle feed.

Another object of my invention is to provide graduated means, adjustable on the head-stock, for automatically throwing out the spindle feed mechanism, whereby the same can be quickly set to govern the feed of the drill and bring the same to rest at any predetermined limit of depth of drill cut desired.

Another object of my invention relates to the control of the direction of drive of the arm-shaft, through means carried by the head-stock.

Another object of my invention relates to the particular form of power transmitting mechanism between the drill spindle and radial arm shaft.

Another object of my invention is to provide a radial drill arm with universal head-stock, with means for controlling such universal adjustment of the head-stock, and longitudinally adjustable thereon from a given point of manipulation.

Another object of my invention is to provide a radial drill arm with a passage-way, adapted to receive the system of variable speed gearing carried by the head-stock and movable therewith longitudinally with the passage-way of the arm.

The various other features of my invention are more fully set forth in the description of the accompanying drawings, forming a part of this specification, in which:—

Figure 1:
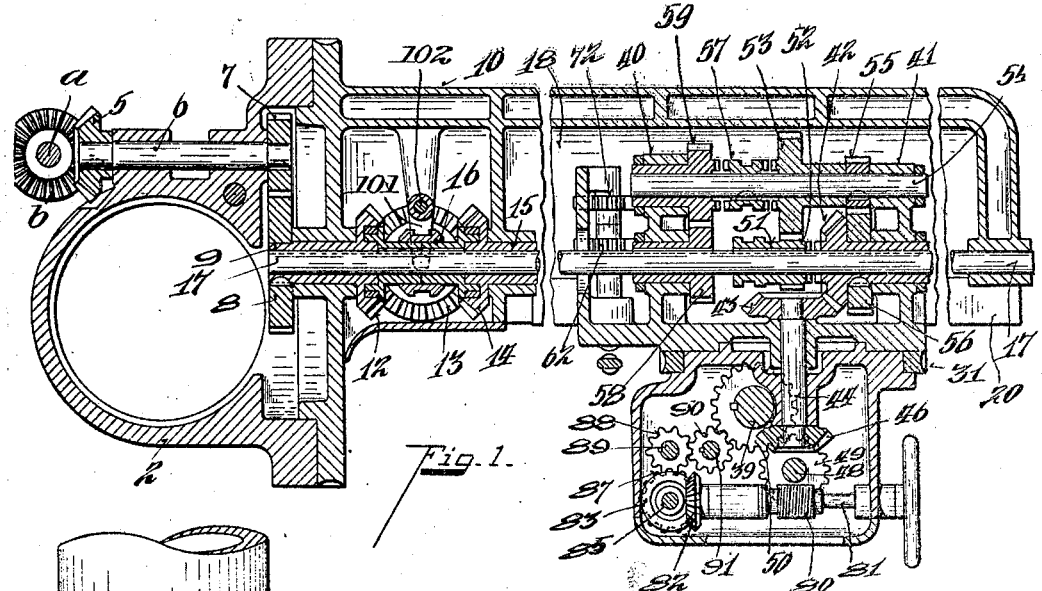
Figure 2:
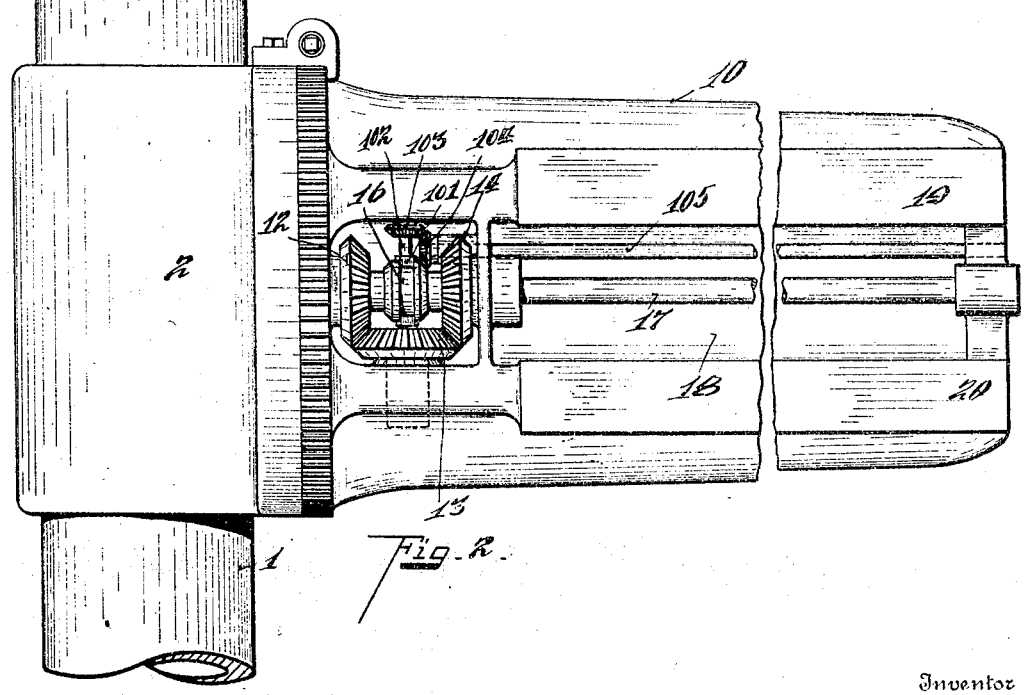

Figure 1 is a horizontal section through the arm and head-stock of my universal radial drill. Fig. 2 is a side elevation of the radial arm. Fig. 3 is a front elevation of the head-stock. Fig. 4 is a section on line b, b, Fig. 3. Fig. 5 is a section on line a, a, Fig. 3. Fig. 6 is a section on line x, x, Fig. 3. Fig. 7 is a section on line c, c, Fig. 5. Fig. 8 is a section on line w, w, Fig. 3. Fig. 9 is an enlarged section on line y, y, Fig. 3. Fig. 10 is an enlarged section on line u, u, Fig. 3. Fig. 11 is a front elevation of a radial drill with my improvements applied. Fig. 12 is a detailed elevation partly in section of the clutch mechanism for controlling the forward and reverse rotation of the radial arm shaft. Fig. 13 is a section on line d, d, Fig. 12. Fig. 14 is a section on line e, e, Fig. 12. Fig. 15 is an enlarged detailed sectional view partly in elevation of the clutch mechanism for controlling the rotation on the spindle feed shaft. Fig. 16 is a section on line f, f, Fig. 15. Fig. 17 is a detailed elevation of the mechanism shown in Fig. 15, with the clutch lever arm shown in section.

1 represents the column of a radial drill.

2 represents the sleeve for supporting the arm carried by the column and adjustable thereon in the usual manner. As illustrated, the arm is what is termed a universal arm, wherein the same is swiveled upon the sleeve 2, so as to angularly support the drill spindle relative to the work. The vertical shaft a is provided with beveled gears, one of which is splined upon the vertical power shaft, carried by the radial arm sleeve, for transmitting motion from the vertical shaft to the horizontal arm shaft, through a system of gears.

5 represents a beveled gear fixed upon the stud shaft 6 and in mesh with a beveled gear b, splined upon the vertical shaft a. Said shaft 6 is suitably journaled in the sleeve 2 of the radial arm, see Fig. 1.

7 represents a gear fixed upon shaft 6 in mesh with a gear 8, fixed upon a sleeve 9, journaled in the arm 10.

12 represents the beveled gear upon sleeve 9, in mesh with a beveled gear 13 journaled in the arm 10, said gear 13 is also in mesh with a gear 14, upon a sleeve 15, journaled in the bearings formed in the arm 10.

16 represents friction clutch member in driven connection with the radial arm shaft 17, adapted to operate friction clutch members carried by the gears 12 and 14, for respectively clutching either one of said gears in driving relation with the radial arm shaft 17, for imparting a forward or reverse drive to the radial arm shaft and for stopping the same when the clutch is in an intermediate position. The clutch member 16 is actuated by mechanism under the control of a lever mounted on the head-stock to enable the drive to be governed from the head-stock and at any position it occupies upon the arm.

The radial arm 10 is of hollow construction with the medial portion of one side projected inwardly, see Fig. 4, U-shaped in cross-section, forming a passage 18 into which the transmission gearing for imparting varying speed to the drill spindle is projected.

19, 20, represent right-angled ways on the forward side of the arm at the extremities of the limbs of the U-shaped wall of the arm. The right angled ways 19 and 20 form a dove-tail thereby providing three bearing surfaces above and below the medial line of the arm, in which two of said surfaces assume a horizontal plane, two a vertical, and two an inclined plane. From the bearing walls the outer wall is of curved outline in cross section, and then extended in oppositely disposed inclined planes toward the medial line of the arm. This construction provides a very rigid arm without materially increasing its weight, which is one of the essential characteristics of a drill of this type; it having been difficult to construct an arm that will withstand the strains without undue flexing. 21 represents a saddle, having a gibbed connection with the vertical portion of said right angled ways 19 and 20, and 22 represents inwardly projecting flanges bearing against the horizontal portion of said right-angled ways. This construction of mounting the saddle forms a very rigid connection against the lateral stresses or shifting strains between the saddle and arm.

As illustrated, the head-stock is of universal form so as to present the drill spindle at any angle to the work.

23 represents the spindle support of the head-stock having a swiveled connection with the saddle 21, so as to universally swing the spindle.

I have provided a single hand wheel for controlling the transverse feed of the head-stock upon the arm and the universal swinging of the spindle support upon the saddle. This is accomplished by the following instrumentalities, see Figs. 3, 4, and 6. 24 represents a hand-wheel fixed to a shaft 25, see Fig. 3, said shaft being journaled in a bearing formed in the saddle 21, its opposite end provided with a pinion 26, fixed thereto and in mesh with a gear 27, fixed to the shaft 28, journaled in bearings formed in the saddle. 29 represents a gear loose on shaft 28, in mesh with the rack 30 fixed parallel with the way 20 of the arm 10. 31 represents a worm wheel fixed to the spindle support 23, and 32 represents the worm in mesh with said worm wheel 31 and loosely journaled upon a stud shaft 33, mounted in the saddle 21. Fixed upon said worm wheel or formed integral therewith is a gear 34, in mesh with a gear 35 loose on shaft 28, see Fig. 6. 36 represents a clutch member splined on the shaft 28 and provided with clutch teeth on each end thereof, adapted to be alternately engaged with clutch teeth formed on the gears 29 and 35, for alternately clutching the same in driving engagement with the shaft 28, whereby the spindle support can be swung upon its saddle or the head-stock moved transversely upon the radial arm by rotating the hand wheel 24. The clutch member 36 is shifted by the lever mechanism 37.

39 represents the spindle journaled in the spindle support 23, and rotated by a variable speed system of gearing, receiving motion from the radial armed shaft 17.

The saddle 21 is provided with the bearing brackets 40, 41, (see Fig. 5) projecting into the passage 18 of the radial arm traveling therein and carrying a system of variable speed gearing and clutch mechanism.

42 represents a beveled gear loosely journaled on the radial arm shaft 17, provided with an elongated sleeve journaled in the bearing bracket 41. Said beveled gear is in mesh with a beveled gear 43, fixed on the stud shaft 44, journaled in bearings formed in the saddle 21 and spindle support 23, see Fig. 1, which construction provides a very substantial bearing for the shaft 44, a material advantage in producing a high power driven drill spindle.

46 represents a beveled gear fixed to the shaft 44, in mesh with a beveled gear 47, fixed to the shaft 48, journaled in bearings formed in the spindle support 23.

49 represents a pinion fixed to the shaft 48, in mesh with a gear 50, fixed to the drill spindle 39.

51, see Fig. 1, represents a clutch member splined upon the radial arm shaft 17, provided with clutch teeth adapted to engage with clutch teeth formed on the face of the beveled gear 42, for clutching said gear in driving relation with the radial arm shaft 17, for imparting a direct drive from shaft 17 to the drill spindle 39, through gears 42, 43, shaft 44, beveled gears 46, 47, shaft 48, and gears 49 and 50.

To impart varying speeds to the beveled gear 42, the following system of gearing is employed: The clutch member 51 is provided upon its periphery with a gear 52, in mesh with a gear 53, loose upon a shaft 54, journaled in the bearings 41, and 55 represents a gear, fixed to the shaft 54, in mesh with a gear 56, fixed to the sleeve of the beveled gear 42. 57 represents a clutch member splined to the shaft 54, provided with clutch teeth, adapted to engage in one position of clutch movement, clutch teeth formed upon the face of the gear 53, for throwing the same into driving engagement with shaft 54. When the clutch member 57 is thus thrown into engagement with gear 53, and the clutch member 51 out of engagement with the beveled gear 42, motion will be transmitted from radial arm shaft 17 to the drill spindle, through clutch member 51, gears 52 and 53, driving shaft 54, thence through gears 55 and 56, driving beveled gear 42, and thence through the system of gearing and shafts, heretofore described, for the direct drive between the radial arm shaft and the drill spindle.

A third speed is imparted from the radial arm shaft to the drill spindle, as follows:— 58 represents a gear splined upon the radial arm shaft 17, provided with a sleeve journaled in the bearing 40, said gear being in mesh with a gear 59, likewise journaled in the bearing 40 and loosely mounted upon the shaft 54, said gear 59 is provided with clutch teeth upon its face, adapted to be engaged by the clutch member 57, for clutching the same in driving relation with shaft 54, in which position the clutch member 57 is disengaged from the gear 53. The drive with the clutch 57 thus engaged will be from shaft 17, through gears 58 and 59, shaft 54, gears 55, 56, driving the beveled gear 42, and thence through the system of gearing, heretofore described, for the direct drive between radial arm shaft and drill spindle.

The clutch members 51 and 57 are shifted by the following instrumentalities, see Figs. 1, 4, 5 and 7. Clutch member 51 is provided with a peripheral groove into which a yoke arm 60 engages, fixed to an actuating rod 61, supported in the bearing bracket 40. Said rod, upon one end, is provided with rack teeth in mesh with a rack gear 62, loose upon the push rod 63, but adapted to be connected thereto. Said push rod is provided with a key 64, adapted to engage into a spline formed in the bore of the gear 62. 65 represents a beveled gear, see Fig. 5, fixed to the push rod 63 in mesh with a sector gear 66, fixed to the rock shaft 67, journaled in the saddle 21, and 68 represents a hand lever fixed to the rock shaft 67, for rotating the same. Thus, when the push rod 63 occupies a position to engage its key 64, with the gear 62, manipulating the hand lever 68, will actuate the transmission elements between the rock shaft 67 and the actuating rod 61, shifting clutch member 51, as desired. 70 represents a yoke arm engaging in a groove formed in the clutch member 57 and fixed to a rod 71, supported in the bracket bearing 40, provided at one end with rack teeth intermeshed with a rack pinion 72, see Fig. 7, loose upon the push rod 63, adapted to be clutched thereto by moving the same inward, bringing the key 64 into engagement with a splineway formed in the bore of said rack pinion 72. By this construction, it will be seen that the hand lever 68 can alternately throw or shift either one of the clutch members 51, 57, through a shifting of the push rod 63, to respectively engage either gear 62 or gear 72 therewith.

The vertical feed of the drill spindle by hand or power, is accomplished by the following instrumentalities:—73 represents a rack sleeve loose upon the drill spindle, provided with angularly cut rack teeth 74, adapted to be intermeshed with the teeth of the worm 75, fixed to the feed shaft 76, journaled in bearings formed on the spindle support 23. 77 represents a clutch member, keyed to the feed shaft 76, and 78 represents a worm wheel loosely mounted upon the clutch member 77, adapted to be thrown into driving relation therewith by means of the clutch lever arm 79. This form of construction, for controlling the driving relation between the worm wheel 78 and feed shaft 76 being of general construction employed in radial drills, whereby when the worm wheel 78 is disconnected from the feed shaft, said feed shaft can be rotated by hand lever 79 for hand feeding. 80 represents a worm fixed upon the horizontal shaft 81, suitably journaled in bearings formed in the spindle support 23, see Figs. 3 and 4, and 82 represents a beveled gear fixed upon shaft 81, in mesh with a beveled gear 83, formed on the clutch sleeve member 84 loosely journaled upon the vertical shaft 85. 86 represents a clutch member splined upon the shaft 85, adapted to be thrown into engagement with clutch sleeve member 84, for connecting the beveled gear 83 in driving relation with shaft 85. 87 represents a gear fixed to the shaft 85, in mesh with an intermediate gear 88, fixed to the shaft 89, which in turn is in mesh with a second intermediate gear 90, fixed to the shaft 91, said gear 90 in turn being in mesh with the gear 50, fixed to the drill spindle 39, heretofore described. Thus, to feed the drill spindle by power, the following transmission elements are in commission:—from gear 50, driven as heretofore described, either by direct drive from the radial arm shaft 17, or through the variable speed system of gearing between the radial arm shaft 17 and gear 50, through gears 90, 88, and 87, driving shaft 85, thence through clutch member 86, in engagement with the clutch member 84, transmitting motion thereto, thence through beveled gears 83, 82, shaft 81, worm 80, worm wheel 78, feed shaft 76, worm 75, to the rack sleeve 73.

It is desirable to stop the cutting feed of the drill spindle at a predetermined limit of spindle feed, which is preferably accomplished by the following instrumentalities, see Figs. 3, 4, 9 and 10. 92 represents an actuating bar slidably supported in the drill support 23, in a vertical position parallel with the drill spindle, pivotally connected to a clutch actuating lever 93, said lever having engagement with the clutch member 86, for actuating the same. 94 represents a slide plate slidably mounted upon the actuating bar 92, provided with rack teeth 95, upon one side thereof, in mesh with a worm 96, keyed to the feed shaft 76. The rotation of the feed shaft moves the slide-plate 94 vertically upon the actuating bar 92, upward or downward according to the rotation of the feed shaft 76. 97 represents a trip collar, adjustably mounted upon the actuating bar 92, and secured thereto by a hand screw 98. Said trip collar is provided with a graduated slide-bar 99, sliding in a dove-tailed groove formed in the slide-plate 94, forming gaging means for gaging the trip collar 97, relatively to and from the slide-plate 94, the distance between the same predetermining the depth of spindle feed and automatically throwing out the power after such predetermined feed has been reached, accomplished through the downward travel of the slide-plate 94, until it engages the trip collar 97, continuing in its downward travel a slight distance sufficient to actuate actuating bar 92 and clutch lever 93, to disengage the clutch member 86, from its driving engagement with the clutch sleeve member 84. By this construction of automatic stop of spindle feed, the parts are within the view of the operator and easily and accurately adjusted for controlling the predetermined limit of spindle feed, by adjusting the trip collar 97, and its graduated slide 99, relatively to a zero indication upon the slide plate 94, irrespective of the adjusted position or feed position of the drill spindle.

100, see Fig. 3, represents a pin fixed to the actuating bar 92, forming a stop to govern the limit of drill spindle feed under normal conditions. The slide-plate 94 in its downward travel moves the trip collar 97 into engagement with the pin 100, disengaging the clutch 86. By this construction, it is impossible to continue the feed drive beyond the limit of travel of the spindle.

It is desirable to control the right and left drive to the radial arm shaft from the head-stock. This is accomplished, as follows, see Figs. 2, 3 and 5. 101 represents a clutch actuating lever carried by the rock shaft 102 and yoked to engage into the peripheral groove of the clutch member 16. 103 represents a beveled gear fixed to the rock shaft 102, to intermesh with a beveled gear 104, fixed to the shaft 105, suitably journaled in the arm and extended parallel with the radial arm shaft 17. 106, see Fig. 5, represents a beveled gear splined upon the shaft 105, slidable thereon and movable with the head-stock. 107 represents a beveled gear in mesh with beveled gear 106, and fixed to a rock shaft 108, journaled in a bearing formed in the saddle 21. 109 represents a hand lever fixed to the shaft 108, for rotating the same, and through the transmission elements comprising beveled gears 107 and 106, shaft 105, beveled gears 104, 103, said shaft 109 will actuate the rock shaft 102, and the clutch lever 101, in the proper direction for clutching either gear 12, or gear 14, to the radial arm shaft, for driving the same either in a forward or reverse direction.

The saddle 21 after it has been adjusted upon the radial arm is preferably clamped upon the ways 19, 20, as follows:—110 represents wedge plates engaging the inclined ends of the ways 19 and 20, respectively, upon one side, and the flange projection 111 formed upon each end of the saddle 21. These wedge plates 110 are wedged against the flanges of the saddle and ways, by drawing the same toward the saddle by means of the bolts 112. This forms a very rigid clamp for securing the head-stock in any adjusted position upon this radial arm.

The friction clutch mechanism for controlling the driving connection between the bevel gears 12, 13 and 14 and radial arm shaft 17, for driving said shaft in its forward or reverse direction, is preferably of a type as illustrated in Figs. 12, 13 and 14, although any well-known form of clutch mechanism may be employed, and the construction herein comprises the two part sleeve 114 keyed to the radial arm shaft 17, each end of said shaft being provided with an annular flange 115, inclosing an annular channel formed in the bevel gears 12, 14 respectively. Each of said gears is provided with a split ring 116 engaging over the outer periphery of the hub of its gear, and the inner periphery of its rim, which form the annular channel. 117 represents a key engaging with said split ring to expand the same to clamp the ring to said peripheries. The key is journaled within the respective flange 115 of the sleeve 114, and provided with an arm 118 adapted to be engaged by a wedge block 119, movable longitudinally within a groove in the sleeve 114. The wedge block is actuated by the annularly grooved clutch member 16, which member is shifted from the right to the left by the clutch controlling mechanism heretofore described. Thus, moving the clutch member 16, say to the left, it will engage and rock the arm 118 adjacent to the gear 12, expand the friction ring within said gear, connecting the same into driving connection with the radial arm shaft 17. Gears 13 and 14 running as idlers, throwing the clutch member 16 to an opposite position will release gear 12, clamp gear 14 to the shaft, it having duplicate clutch mechanism as that of gear 12, and consequently the power will be transmitted through gears 12, 13 and 14, rotating the gear 14 in a reverse direction, and imparting such rotation to the radial arm shaft 17.

The clutch mechanism 77 controlling the feed shaft 76 is illustrated in its preferred form in Figs. 15, 16 and 17, and comprises the following elements:—120 represents a sleeve fixed to the feed shaft 76, one end provided with the flanges 121 forming a support for the clutch controlling member 79. 122 represents a split ring mounted within an annular flange projecting from the worm wheel 78, and 123 represents a key projected from the controlling lever 79 adapted to engage between the ends of the split ring to expand the same within the annular flange of the worm wheel 78, locking the worm wheel to the sleeve 120, and feed shaft 76. The key 123 rocking with the lever 79 moves to and from the gear wheel 78 to enable clamping of the gear 78 with the feed shaft 76 in one position, and released in a second position, and in such released position the hand lever 79 can be utilized for rotating the feed shaft 76 by hand in either direction. Any well-known type of clutch mechanism may be utilized common in the arts or otherwise, to accomplish the same results.

Having described my invention, I claim:—

1. A radial drill arm of hollow formation, comprising a forward wall having an intermediate U-shaped portion, and oppositely disposed vertical and inclined surfaced portions in cross section providing three bearing surfaces above and below the medial line of the arm, and a rear wall connecting with said forward wall, at the upper and lower portions thereof of curved outline in cross section, and extended in oppositely disposed inclined planes toward the medial line of the arm.

2. A radial drill arm of hollow formation, comprising a forward wall having an intermediate U-shaped portion and oppositely disposed vertical and inclined portions in cross-section, providing three bearing surfaces above and below the medial line of the arm, and a rear wall connecting with said forward wall with the upper and lower portions thereof of curved outline in cross section, tapering lengthwise of the arm, and extended in oppositely disposed inclined planes toward the medial line of the arm.

3. In a radial drill, an arm, an arm shaft, clutch and gear mechanism carried by said arm for governing the direction of rotation of said arm shaft, a head-stock slidably mounted upon said arm, a clutch operating shaft journaled in said arm, for actuating said clutch mechanism, clutch manipulating mechanism carried by said head-stock, and transmission elements between said clutch manipulating mechanism on the head-stock and actuating shaft, whereby the direction of rotation of arm shaft can be controlled from the head-stock at any position it occupies on the radial arm.

4. A radial drill arm, having an arm shaft, clutch and gear mechanism for imparting forward and reverse rotation of said shaft, a head-stock slidably mounted upon said arm, a clutch operating shaft carried by said arm connecting with said clutch mechanism, a clutch manipulating lever carried by said head-stock, and intermediate transmission elements between said clutch shaft and head-stock manipulating lever slidable along said clutch shaft, whereby the direction of rotation can be governed at any position of the head-stock upon the arm.

5. In a radial drill, a radial arm, a head-stock, slidably supported upon ways formed on said arm, means for swinging said head-stock relatively to the arm, a rack carried by the arm, clutch and gear mechanism between the rack on the arm and head-stock swinging mechanism, and manipulating means carried by the head-stock, whereby said clutch mechanism can be shifted for alternately feeding the head-stock upon the arm or universally swinging the same.

6. In a radial drill, a radial arm, a saddle slidably mounted upon said arm, a drill spindle support rotatably mounted upon said saddle, a worm wheel carried by said spindle support, a rack carried by said radial arm, a worm and a rack gear journaled upon said saddle intermeshing respectively with said worm wheel and rack, and transmission means between said worm and rack gear adapted to be alternately thrown into driving relation therewith for swinging the spindle support or feeding the saddle longitudinally on the arm.

7. In a radial drill, an arm, a driving shaft journaled therein, a head-stock slidably mounted upon said arm, a drill spindle carried thereby, transmission elements between the driving shaft and drill spindle for feeding the latter, clutch mechanism for controlling the same, in combination with means for automatically stopping the spindle feed at predetermined limits of its travel, comprising clutch controlling lever mechanism, a slide plate movable relative thereto, feeding mechanism in connection with said spindle feeding mechanism and slide plate, and a slide bar adjustable relative to the movement of said slide plate, and in connection with said clutch controlling lever mechanism to enable the slide plate to engage with said slide bar at predetermined limits in its travel, to actuate said clutch lever mechanism, for automatically discontinuing the spindle feed.

8. In a drill, a head-stock, a drill spindle carried thereby, power feeding elements for said spindle, clutch mechanism for controlling said spindle feed and power elements, a clutch actuating member mounted on said head-stock, a slide plate slidable on said clutch actuating member in feeding connection with said power elements, and movable relatively with the drill spindle, gage mechanism in connection with said clutch actuating member and adjustable thereon in the path of slide plate travel and adapted to be engaged thereby for operating said clutch mechanism to discontinue the spindle feed.

9. In a drill, a head-stock, a drill spindle carried thereby, power feeding elements for said spindle, clutch mechanism for controlling said power feeding elements, a clutch actuating member mounted on said head-stock, a member movable on said clutch actuating member in feeding connection with said power feeding elements of the spindle, for feeding the same relatively with the feed of said spindle, a stop member adjustably mounted upon said clutch actuating member, adapted to be engaged by said de plate to actuate said clutch actuating member and clutch mechanism to automatically discontinue the spindle feed at a predetermined limit.

10. In a radial drill, an arm, an intermediate passage formed in said arm for the reception of transmission elements to the head-stock, a radial arm shaft journaled in said arm, a head-stock slidably mounted upon said arm, a drill spindle journaled in said head-stock, a system of gearing in driving connection with said arm shaft and drill spindle, carried by the head stock and movable therewith, comprising a shaft journaled in the head-stock parallel with the arm shaft, a series of gears thereon, intermeshing respectively with gearing slidable on the arm shaft, clutching devices for respectively clutching said gearing in a driving train between said arm shaft and head-stock shaft, a shaft transverse to said aforesaid shafts in driving connection with one of the gears on said arm shaft, and gearing positively driven between said last-named shaft and drill spindle.

11. In a radial drill, a radial arm, a head-stock adjustable thereon, a radial arm shaft journaled in said arm, extensions formed on said head-stock and projected into said radial arm, a second shaft journaled in said bracket extension and parallel with the radial arm shaft, transmission gearing between said radial arm shaft and second shaft, and clutching mechanism therefor for producing various speed drives to the drill spindle.

12. In a radial drill, a radial drill arm provided with an intermediate passage on one side thereof extended inwardly, right angled ways formed along the outer extremities of said passage, a head-stock adjustably supported upon said ways, a radial arm shaft journaled in said arm, bearing extensions carried by said head-stock projecting into said passage-way, a second shaft journaled in said head-stock bearing extensions parallel with the radial arm shaft, and transmission gearing between said shafts.

13. In a radial drill, a radial arm, a head-stock slidably supported on ways formed on said arm, a driving shaft journaled on said arm, gear and clutch mechanism for imparting forward and reverse rotation to said shaft, a clutch operating shaft journaled in said arm, parallel with the driving shaft, and connecting the said clutch mechanism, and means movable with the head-stock in operative connection with said clutch shaft for controlling the rotation of said driving shaft at any position the head-stock occupies on the arm.

14. In a radial drill, a radial arm provided with a pair of oppositely disposed right-angle ways, each terminating in an angular way, a head-stock supported on said ways, wedge plates engaging said angular ways and head-stock, adapted to be drawn toward the head-stock to rigidly clamp the head-stock to the arm simultaneously in horizontal and vertical planes.

15. In a radial drill, a radial arm, a driving shaft journaled thereon, a saddle slidable on said arm having a bearing projected at right angles to said driving shaft, a head-stock rotatable on said saddle provided with a bearing concentric with said saddle bearing, a drill spindle journaled in said head stock, a shaft journaled in said concentric head-stock and saddle bearings, a vertical shaft journaled in said head-stock, a series of bevel gears connecting said driving shaft, second shaft and vertical shaft, and gears connecting said vertical shaft and spindle.

In testimony whereof, I have hereunto set my hand.

HERMAN W. SCHATZ.

Witnesses:
OLIVER B. KAISER,
EMMA SPENER.